US012790572B2

(12) United States Patent
Choi et al.

(10) Patent No.: US 12,790,572 B2
(45) Date of Patent: Nov. 10, 2026

(54) METHOD FOR IMPROVING AFTERTASTE OF ALCOHOLIC BEVERAGES USING ALLULOSE

(71) Applicant: CJ CHEILJEDANG CORPORATION, Seoul (KR)

(72) Inventors: Jong Min Choi, Suwon-si (KR); Su-Jeong Kim, Suwon-si (KR); Youn-Kyung Bak, Suwon-si (KR); Jung Gyu Park, Incheon (KR); Sung Bae Byun, Sejong (KR); Dong Seok Shim, Yongin-si (KR); In Lee, Suwon-si (KR); Seung Won Park, Yongin-si (KR); Dong Chul Jung, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 280 days.

(21) Appl. No.: 18/436,536

(22) Filed: Feb. 8, 2024

(65) Prior Publication Data

US 2024/0174956 A1 May 30, 2024

Related U.S. Application Data

(63) Continuation of application No. 17/870,417, filed on Jul. 21, 2022, now abandoned, which is a continuation of application No. 16/336,604, filed as application No. PCT/KR2017/010847 on Sep. 28, 2017, now abandoned.

(30) Foreign Application Priority Data

Oct. 7, 2016 (KR) ........................ 10-2016-0130094

(51) Int. Cl.
*C12G 3/06* (2006.01)
*A23L 5/20* (2016.01)
*C12H 6/00* (2019.01)
*C12H 6/02* (2019.01)

(52) U.S. Cl.
CPC .................. *C12G 3/06* (2013.01); *A23L 5/20* (2016.08); *C12H 6/00* (2019.02); *C12H 6/02* (2019.02)

(58) Field of Classification Search
CPC ... C12G 3/08; C12G 3/06; C12H 6/02; C12H 6/00; A23L 27/88; A23L 5/20
See application file for complete search history.

(56) References Cited

U.S. PATENT DOCUMENTS

| | | | |
|---|---|---|---|
| 8,071,558 B2 | 12/2011 | Tokuda et al. | |
| 9,215,887 B2 | 12/2015 | Yoshida et al. | |
| 10,729,632 B2 | 8/2020 | Fletcher et al. | |
| 2009/0062215 A1 | 3/2009 | Tokuda et al. | |
| 2011/0045137 A1 | 2/2011 | Yoshida et al. | |
| 2012/0070534 A1* | 3/2012 | Suzuki .................. | C12G 3/022 426/11 |
| 2012/0094940 A1 | 4/2012 | Takamine et al. | |
| 2013/0309388 A1 | 11/2013 | Yano et al. | |
| 2014/0342074 A1 | 11/2014 | Kim et al. | |
| 2015/0110940 A1 | 4/2015 | Lee et al. | |
| 2015/0359251 A1 | 12/2015 | Jackson et al. | |
| 2016/0198751 A1 | 7/2016 | Fletcher et al. | |
| 2016/0302463 A1 | 10/2016 | Woodyer et al. | |
| 2016/0324201 A1 | 11/2016 | Kim et al. | |
| 2017/0079313 A1 | 3/2017 | Woodyer et al. | |
| 2018/0243325 A1 | 8/2018 | Choi et al. | |
| 2018/0249744 A1 | 9/2018 | Baniel et al. | |
| 2019/0021381 A1 | 1/2019 | Baniel et al. | |
| 2019/0029299 A1 | 1/2019 | Bak et al. | |
| 2019/0037901 A1 | 2/2019 | Jackson et al. | |
| 2019/0239539 A1 | 8/2019 | Shim et al. | |
| 2019/0246673 A1 | 8/2019 | Park et al. | |
| 2019/0297934 A1 | 10/2019 | Jackson et al. | |
| 2020/0029612 A1 | 1/2020 | Jackson et al. | |

FOREIGN PATENT DOCUMENTS

| | | | |
|---|---|---|---|
| CA | 2 996 661 | A1 | 3/2017 |
| CA | 2 996 664 | A1 | 5/2017 |
| CL | 2016002955 | A1 | 5/2017 |
| CL | 2018000523 | A1 | 2/2019 |
| CL | 2019000872 | A1 | 6/2019 |
| CL | 2019000875 | A1 | 6/2019 |
| EP | 1864669 | A1 | 12/2007 |
| EP | 3060073 | A1 | 8/2016 |
| EP | 3427601 | A1 | 1/2019 |
| GB | 2536304 | A | 9/2016 |
| JP | H08224075 | A | 9/1996 |
| JP | 2010200719 | A | 9/2010 |
| JP | 2014014276 | A | 1/2014 |
| JP | 2014018162 | A | 2/2014 |

(Continued)

OTHER PUBLICATIONS

"Jim Beam Highball Can" New Release "Jim Beam Citrus Highball Can <Grapefruit>," *Renewal*, No. 12550, Jan. 2016 (4 pages) (w/ English translation).
"Rare Sugar Premium Chuhai," *Ameba*, Onsen Let's relax at hot spring: 1-5, May 2015 (w/ English Machine Translation).
Amazon, "Choya Light plum wine [1800ml]," *Amazon JP*, 2009.
Amazon, "Choya Plum Wine, Kishu [720ml]," *Amazon JP*, 2009, English abstract.
Amazon, "Choya plum wine, The Choya Aged 3 Years [720ml]," *Amazon JP*, 2016.
Amazon, "Suntory mellow ripe plum wine [2000ml]," *Amazon*, 2012.

(Continued)

*Primary Examiner* — Vera Stulii
(74) *Attorney, Agent, or Firm* — Seed Intellectual Property Law Group LLP

(57) ABSTRACT

The present invention relates to an agent for improving aftertaste of alcoholic beverages comprising allulose-containing saccharides, and a method for improving aftertaste of alcoholic beverages using allulose.

1 Claim, 1 Drawing Sheet

(56) References Cited

FOREIGN PATENT DOCUMENTS

| | | | |
|---|---|---|---|
| JP | 2015023803 | A | 2/2015 |
| JP | 5764308 | B2 | 8/2015 |
| KR | 2003-0093360 | A | 12/2003 |
| KR | 2011-0016906 | A | 2/2011 |
| KR | 2012-0029365 | A | 3/2012 |
| KR | 2013-0029754 | A | 3/2013 |
| KR | 101320082 | B1 | 10/2013 |
| KR | 101325061 | B1 | 11/2013 |
| KR | 2015-0127155 | A | 11/2015 |
| KR | 2016-0075467 | A | 6/2016 |
| TW | 201219563 | A | 5/2012 |
| WO | WO 2011048616 | A2 | 4/2011 |
| WO | WO 2015015209 | A1 | 2/2015 |
| WO | WO 2015075473 | A1 | 5/2015 |
| WO | WO 2015195713 | A1 | 12/2015 |

OTHER PUBLICATIONS

Canadian Office Action, mailed Sep. 15, 2020, for corresponding Canadian Patent Application No. 3,039,148, 6 pages.
Chile Office Action and translation, dated Jun. 19, 2020, for corresponding Chilean Patent Application No. 201900851, 22 pages.
Eater Staff, "Know your Soiu from your Shochu," *Eater DC*, Oct. 29, 2013. (4 pages).
Extended European Search Report, dated May 6, 2020, for corresponding European Patent Application No. 17858689.7, 8 pages.
Jae-Un, "Soiu, Korea's representative liquor," KOREA.net, Jul. 22, 2015. (6 pages).
Lee, "Strange Alternative Sweetener Named Allulose," *Naver Blog*: 1-5, Sep. 2, 2016 (w/ English Machine translation).
Mintel, "Allulose Sugar Blend," XP055686791, www.gnpd.com, Database accession No. 4228821, Aug. 22, 2016.
Mintel, "Allulose," XP055686788, www.gnpd.com, Database accession No. 3968713, May 3, 2016.
"Kikusui Sake Brewery, Alcoholic Beverage, Low calories with rare sugar," *Nihon Keizai Newspaper morning edition*, May 12, 2014 (w/ English abstract).
Rare Sweet Co., Ltd. and Matsutani Chemical Industry Co., Ltd., About the rare sugar-containing syrup "Rare Sugar Sweet," Ltd. News Release, Apr. 8, 2016, (w/ English abstract).
Shikoku Area Campaign • Event Information, "What is "Rare Sugar Beam Highball" from Kagawa? We will also introduce st10ps where you can drink in the prefecture," Chugoku, May 2016 (w/ English Machine Translation).
Shiraishi et al., "Characteristic odour compounds in *shochu* derived from rice *koji*," *J Inst. Brew* 122:381-387, 2016.
Singapore Office Action, dated May 26, 2020, for corresponding Singapore Patent Application No. 11201901752R, 11 pages.

* cited by examiner

METHOD FOR IMPROVING AFTERTASTE OF ALCOHOLIC BEVERAGES USING ALLULOSE

FIELD OF THE INVENTION

The present invention relates to an agent for improving an alcohol flavor of an alcoholic beverage, which includes allulose-containing saccharides, and a method of improving an alcohol flavor of an alcoholic beverage using allulose.

DESCRIPTION OF THE RELATED ART

Ethanol (i.e., ethyl alcohol) contained in foods has an unpleasant flavor such as unique alcohol smell or bitterness. Such an unpleasant flavor becomes stronger with increasing alcohol concentration. Particularly, in the case of distilled alcoholic beverage having a high alcohol concentration, such as soju or rum, increase in sales is slowing down due to the unpleasant flavor thereof. Recent development of soju with low alcohol content or fruit soju with added flavor and increase in sales volume represents changes in preference of consumers who avoid the strong bitterness and smell of alcohol.

There has been proposed a method of using a glycoside-based sweetener such as steviol glycoside or enzyme-treated *Stevia* instead of a sugar-based sweetener such as sugar or fructose in order to reduce the flavor of soju and to mask a bitterness and tangy taste thereof (Korean Patent No. 10-1320082). However, such a glycoside-based sweetener has poor sensory properties such as delayed sweetness, unique bitterness, or foreign body sensation.

In addition, there has been proposed a method of applying allulose to beer or the like (Japanese Patent No. 5764308). However, in this method, allulose is used to maintain or improve a flavor of raw materials, and use of allulose to suppress a smell and bitterness unique to alcohols has not been proposed yet.

The present inventors have made efforts to reduce smell and bitterness of alcohol of alcoholic foods. As a result, the present inventors found that addition of allulose can mask the smell and bitterness of alcohol for a given amount of alcohol, and thus completed the present invention.

SUMMARY OF THE INVENTION

It is one object of the present invention to provide an agent for improving an alcohol flavor of alcoholic foods, which includes allulose-containing saccharides.

It is another object of the present invention to provide a method of improving an alcohol flavor of alcoholic foods using allulose.

In accordance with one aspect of the present invention, an agent for improving an alcohol flavor of an alcoholic beverage includes allulose-containing saccharides and ethanol.

The allulose according to the present invention may be extracted directly from natural products, or may be chemically or biologically synthesized, without being limited thereto. In addition, the allulose may be provided in crystal form or in allulose-containing syrup form (i.e., in liquid form).

As used herein, "alcoholic beverage" refers to a beverage containing an edible alcohol (i.e., ethanol).

In one embodiment, the ethanol may be present in an amount of 6% by volume (vol %) to 70 vol %, specifically 6 vol % to 50 vol %, 6 vol % to 45 vol %, 6 vol % to 40 vol %, 6 vol % to 30 vol %, 6 vol % to 25 vol %, 6 vol % to 20 vol %, 6 vol % to 18 vol %, 8 vol % to 70 vol %, 8 vol % to 50 vol %, 8 vol % to 45 vol %, 8 vol % to 40 vol %, 8 vol % to 30 vol %, 8 vol % to 25 vol %, 8 vol % to 20 vol %, 8 vol % to 18 vol %, 13 vol % to 70 vol %, 13 vol % to 50 vol %, 13 vol % to 45 vol %, 13 vol % to 40 vol %, 13 vol % to 30 vol %, 13 vol % to 25 vol %, 13 vol % to 20 vol %, 13 vol % to 18 vol %, 15 vol % to 70 vol %, 15 vol % to 50 vol %, 15 vol % to 45 vol %, 15 vol % to 40 vol %, 15 vol % to 30 vol %, 15 vol % to 25 vol %, 15 vol % to 20 vol %, or 15 vol % to 18 vol %, based on the total volume of the alcoholic beverage.

In one embodiment, the alcoholic beverage may be a distilled alcoholic beverage or a fermented alcoholic beverage. As used herein, "distilled alcoholic beverage" refers to an alcoholic beverage obtained by distilling alcohol-fermented fruit juices, plant juices, or brewed starches (cereals).

Specifically, the alcoholic beverage may be a distilled alcoholic beverage, more specifically Soju, kaoliang liquor, brandy, Armagnac, whiskey, vodka, rum, gin, tequila or cognac.

In addition, the alcoholic beverage may be a fermented alcoholic beverage, more specifically beer, wine, sake, or makgeolli.

In one embodiment, the alcohol flavor may be an alcohol bitterness and/or an alcohol smell.

In one embodiment, improving the alcohol flavor may include reducing or masking the alcohol flavor.

In one embodiment, the allulose may be present in an amount of 50 parts by weight to 100 parts by weight, specifically 70 parts by weight to 100 parts by weight, 90 parts by weight to 100 parts by weight, 95 parts by weight to 100 parts by weight, 98 parts by weight to 100 parts by weight, 98.5 parts by weight to 100 parts by weight, 99 parts by weight to 100 parts by weight, or 99.5 parts by weight to 100 parts by weight, relative to 100 parts by weight of the saccharides in terms of dried solid content.

The saccharides may further include at least one sweetener, in addition to allulose. Examples of the sweetener may include any known sweetener, for example, monosaccharides, disaccharides, oligosaccharides, sugar alcohols, and high-strength sweeteners, without being limited thereto. Examples of the monosaccharides may include arabinose, xylose, fructose, tagatose, allose, and galactose. The disaccharides refer to a group of carbohydrates consisting of two monosaccharide units linked together, and examples thereof may include lactose, maltose, trehalose, turanose, and cellobiose. The oligosaccharides refer to a group of carbohydrates consisting of 3 or more monosaccharide units linked together, and examples thereof may include fructooligosaccharide, isomaltooligosaccharide, xylooligosaccharide, gentio-oligosaccharide, maltooligosaccharide, and galactooligosaccharide. The sugar alcohols refer to compounds obtained by reducing a carbonyl group in saccharides, and examples thereof may include erythritol, xylitol, arabitol, mannitol, sorbitol, maltitol, and lactitol. The high-strength sweeteners refers to sweeteners having a sweetness ten times or greater that of sugar, and examples thereof may include aspartame, acesulfame K, rebaudioside A, and sucralose, without being limited thereto. In another embodiment, the saccharides according to the present invention may be free from sucrose, glucose, or a combination thereof.

In one embodiment, the allulose-containing saccharides may be present in an amount of 0.1 g to 10 g, specifically 0.1 g to 3.0 g or 0.3 g to 3.0 g per 1 L of the alcoholic beverage.

In one embodiment, the allulose may be present in an amount of 5 g to 600 g, specifically 5 g to 170 g, 16 g to 170 g, 5.55 g to 166.7 g, or 16.7 g to 166.7 g per 1 L of the ethanol. Herein, the ethanol as a reference refers to pure ethanol (i.e., 100% ethanol).

In accordance with another aspect of the present invention, a method of improving an alcohol flavor of an alcoholic beverage includes: adding allulose to the alcoholic beverage; or adding allulose to a beverage, followed by adding ethanol to the beverage.

The alcoholic beverage may be prepared commercially by distilling a mash obtained through a process in which cereal grains or potatoes, as raw materials, are subjected to alcohol fermentation, followed by aging, or by diluting water-free alcohol with water and adding a sweetener and the like to the diluted alcohol. An allulose-containing alcoholic beverage may be prepared by adding the allulose to the prepared alcoholic beverage, or by adding the allulose to the raw materials in preparation of the alcoholic beverage.

In the method of improving an alcohol flavor of an alcoholic beverage, the allulose, the ethanol, the alcoholic beverage, the saccharides, the alcohol flavor, and improving alcohol flavor are the same as described in the above aspect.

The present invention provides a method in which allulose is added to alcoholic foods having a high alcohol content, especially alcoholic beverages to mask unpleasant alcohol bitterness and smell, thereby considerably improving sensory preference of the foods without using separate additives.

Figure 1:
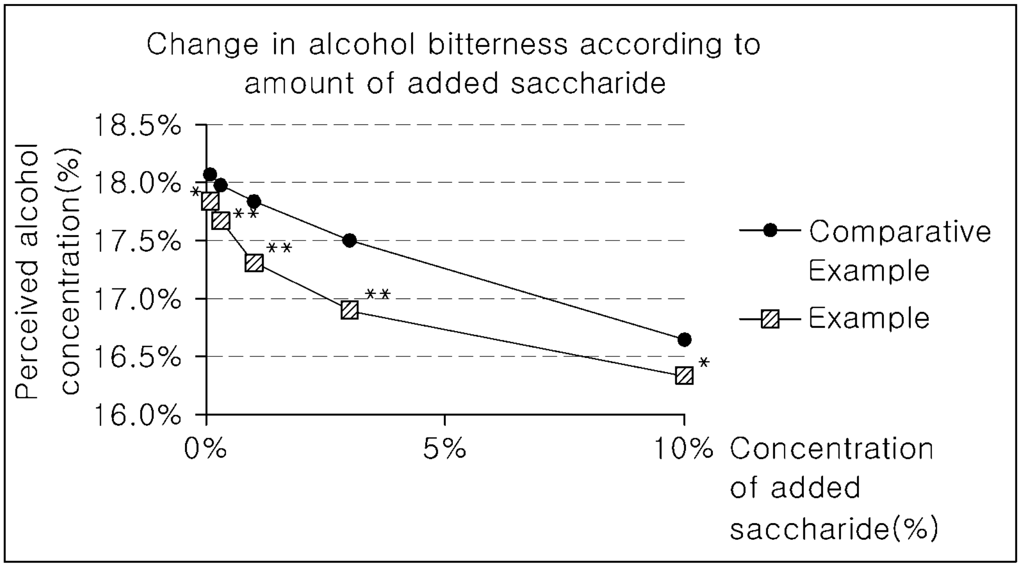
FIG. 1 is a graph showing a relationship between alcohol concentration and alcohol bitterness according to Examples and Comparative Examples.

(※ In the drawings, * indicates a statistically significant trend ($p<0.1$), and ** indicates a statistically significant difference ($p<0.05$).)

DETAILED DESCRIPTION OF THE INVENTION

Hereinafter, the present invention will be described in more detail with reference to examples. However, it should be noted that these examples are provided for illustration only and should not be construed in any way as limiting the invention. In addition, these examples are provided for more complete understanding of the present invention by one of ordinary skill in the art.

Experimental Example 1: Preparation and Quality Analysis of Diluted Soju

Generally, alcoholic beverages have varying alcohol contents depending upon the kind and manufacturing method thereof. Beer has an alcohol content of 4 vol % to 12 vol % (generally 5 vol %), wine has an alcohol content of 6 vol % to 12 vol % (generally 8 vol %), Sake has an alcohol content of 8 vol % to 15 vol % (generally 13 vol %), and soju has an alcohol content of 14 vol % to 20 vol % (generally 18 vol %). For an alcoholic beverage having an alcohol content of less than 6 wt %, since an unpleasant flavor of alcohol is not significant, diluted soju having an alcohol content of 8.0% or more was prepared to check change in quality due to addition of allulose.

(1) Preparation of Diluted Soju

Diluted soju samples of Comparative Examples 1 to 3 and Examples 1 to 3 were prepared as follows. First, purified water was added to a rectified spirit having an alcohol concentration of 95 vol %, thereby preparing 10 L of a primarily diluted rectified spirit having an alcohol concentration of 50 vol %. Then, activated carbon powder was mixed with the primarily diluted rectified spirit, followed by aging and deodorization for 1 to 3 hours, and then the resulting mixture was clarified using a filter containing diatomaceous earth (SELECT® A20, BEGEROW Co.). Then, sugar (purity: 98 wt % or more, White Sugar, CJ Cheiljedang) or allulose (crystal allulose, purity: 98 wt % or more, CJ Cheiljedang) was mixed with the clarified mixture in amounts as listed in Table 1, followed by adding purified water, thereby preparing 1 L of a secondarily diluted rectified spirit. Then, the secondarily diluted rectified spirit was clarified in the same manner as the primarily diluted rectified spirit.

In addition, purified water was added to the clarified primarily diluted rectified spirit to dilute the sprit to alcohol concentrations as listed in Table 2, thereby preparing Sensory Comparison Examples for sensory evaluation.

TABLE 1

| | Primarily diluted rectified spirit | Sugar | Allulose | Final volume | Alcohol concentration | Sweetener concentration |
|---|---|---|---|---|---|---|
| Note | 50 vol % | — | — | — | — | — |
| Unit | mL | g | g | mL | vol % | g/L % |
| Comparative Example 1 | 160 | 10 | | 1000 | 8.0% | 1.0% |
| Comparative Example 2 | 260 | 10 | | 1000 | 13.0% | 1.0% |
| Comparative Example 3 | 360 | 10 | | 1000 | 18.0% | 1.0% |
| Example 1 | 160 | | 10 | 1000 | 8.0% | 1.0% |
| Example 2 | 260 | | 10 | 1000 | 13.0% | 1.0% |
| Example 3 | 360 | | 10 | 1000 | 18.0% | 1.0% |

TABLE 2

| Note<br>Unit | Primarily diluted rectified spirit 50 vol %<br>mL | Sugar —<br>g | Allulose —<br>g | Final volume —<br>mL | Alcohol concentration —<br>vol % | Sweetener concentration —<br>g/L % | Score of smell or bitterness intensity of alcohol in sensory evaluation |
|---|---|---|---|---|---|---|---|
| Sensory comparison A1 | 100 | | | 1000 | 5.0% | 0.0% | 1 |
| Sensory comparison A2 | 120 | | | 1000 | 6.0% | 0.0% | 3 |
| Sensory comparison A3 | 140 | | | 1000 | 7.0% | 0.0% | 5 |
| Sensory comparison A4 | 160 | | | 1000 | 8.0% | 0.0% | 7 |
| Sensory comparison A5 | 180 | | | 1000 | 9.0% | 0.0% | 9 |
| Sensory comparison B1 | 200 | | | 1000 | 10.0% | 0.0% | 1 |
| Sensory Comparison B2 | 220 | | | 1000 | 11.0% | 0.0% | 3 |
| Sensory Comparison B3 | 240 | | | 1000 | 12.0% | 0.0% | 5 |
| Sensory comparison B4 | 260 | | | 1000 | 13.0% | 0.0% | 7 |
| Sensory comparison B5 | 280 | | | 1000 | 14.0% | 0.0% | 9 |
| Sensory comparison C1 | 300 | | | 1000 | 15.0% | 0.0% | 1 |
| Sensory comparison C2 | 320 | | | 1000 | 16.0% | 0.0% | 3 |
| Sensory comparison C3 | 340 | | | 1000 | 17.0% | 0.0% | 5 |
| Sensory comparison C4 | 360 | | | 1000 | 18.0% | 0.0% | 7 |
| Sensory comparison C5 | 380 | | | 1000 | 19.0% | 0.0% | 9 |

(2) Sensory Evaluation

Sensory evaluation was carried out by 15 trained panelists. Here, the panelists were provided with the standard products as Sensory Comparison Examples (Table 2) and trained to be fully aware of an unpleasant bitterness and smell inherent to alcohol and compare intensity of the bitterness and smell to match a randomly offered diluted soju sample to the alcohol concentration thereof.

Specifically, sensory evaluation was carried out through the following procedure. First, the panelists were placed in separate rooms, respectively, and then provided with Sensory Comparison Examples to be aware of the bitterness and smell inherent to alcohol, once more, prior to being provided with the samples of Examples and Comparative Examples. Thereafter, the samples of Example 1 and Comparative Example 1, each labelled with a three-digit random number, were provided in a transparent cup one by one in a double-blind fashion. During evaluation, each of the panelists was instructed to hold the sample in his/her mouth to taste the sample before spitting the sample out, to be prevented from becoming intoxicated due to excessive intake. In addition, after evaluation of each sample, the panelists were allowed to rinse their mouths with cooked rice and water to prepare for evaluation of the next sample. Each of the trained panelists evaluated intensity of the smell and bitterness of alcohol of each of the samples of Examples and Comparative Examples on a 9-point scale (as shown in Table 2) with reference to Sensory Comparison Examples.

For evaluation of Example 1 and Comparative Example 1, evaluation of Example 2 and Comparative Example 2, and evaluation of Example 3 and Comparative Example 3, Sensory Comparison Examples A1 to A5, Sensory Comparison Examples B1 to B5, and Sensory Comparison Examples C1 to C5 were provided, respectively. In addition, after each evaluation, the panelists were allowed to rest for at least 12 to 24 hours to avoid confusion due to excessive intake.

For the samples of Example 1 and Comparative Example 1, the samples of Example 2 and Comparative Example 2, and the samples of Example 3 and Comparative Example 3, scores of intensity of the smell or bitterness of alcohol in sensory evaluation (hereinafter, "sensory scores") were converted into alcohol concentration according to Equation 1, Equation 2, and Equation 3, respectively, thereby calculating perceived alcohol concentrations, which in turn were compared with the actual alcohol concentrations to confirm reduction effects in smell and bitterness of alcohol.

Perceived alcohol concentration (%)=(0.005×sensory score+0.045)×100 <Equation 1>

Perceived alcohol concentration (%)=(0.005×sensory score+0.095)×100 <Equation 2>

Perceived alcohol concentration (%)=(0.005×sensory score+0.145)×100 <Equation 3>

Statistical analysis was performed using SAS 9.1 program (SAS Inc., Cary, NC, USA), and sensory evaluation results were analyzed by t-test method. All analysis results were approved at a significance level of $p<0.05$.

As a result, it was confirmed that the samples of Examples had a perceived alcohol concentration (i.e., intensity of smell and bitterness of alcohol) that is about 0.6% to 0.8% lower than the actual alcohol concentration. In addition, it could be seen that the samples of Examples 1 to 3 containing allulose exhibited a statistically significant decrease ($p<0.05$) in smell and bitterness of alcohol, as compared with those of Comparative Examples 1 to 3 containing the same amount of saccharides.

TABLE 3

| Sample | Comparative Example 1 | Example 1 | Comparative Example 2 | Example 2 | Comparative Example 3 | Example 3 |
|---|---|---|---|---|---|---|
| Actual alcohol concentration | 8.0% | | 13.0% | | 18.0% | |
| Perceived alcohol concentration (bitterness) | 7.8% | 7.4% | 13.1% | 12.2% | 17.9% | 17.3% |
| p-value | 0.013 | | 0.000 | | 0.001 | |

TABLE 4

| Sample | Comparative Example 1 | Example 1 | Comparative Example 2 | Example 2 | Comparative Example 3 | Example 3 |
|---|---|---|---|---|---|---|
| Actual alcohol concentration | 8.0% | | 13.0% | | 18.0% | |
| Perceived alcohol concentration (smell) | 7.9% | 7.5% | 13.1% | 12.3% | 18.0% | 17.4% |
| p-value | 0.021 | | 0.000 | | 0.001 | |

Experimental Example 2: Preparation and Quality Analysis of Diluted Soju Having Different Saccharide Concentrations In order to confirm saccharide concentration-dependent reduction effects in smell and bitterness of alcohol, changes in quality of diluted soju with varying amount of added allulose were checked for a given alcohol concentration. Here, the alcohol concentration was set to 18%, which is an alcohol concentration of the most typical diluted soju in Korea.

(1) Preparation of Diluted Soju Having Different Saccharide Concentrations

Samples of Comparative Examples 4 to 8, samples of Examples 4 to 8, and Sensory Comparison Examples D1 to D5 were prepared in the same manner as in Experimental Example 1 except that amounts of saccharides were changed as listed in Tables 5 and 6.

TABLE 5

| Note<br>Unit | Primarily diluted rectified spirit 50 vol %<br>mL | Sugar<br>—<br>g | Allulose<br>—<br>g | Final volume<br>—<br>mL | Alcohol concentration<br>—<br>vol % | Sweetener concentration<br>—<br>g/L % |
|---|---|---|---|---|---|---|
| Comparative Example 4 | 350 | 1 | | 1000 | 18.0% | 0.10% |
| Comparative Example 5 | 350 | 3 | | 1000 | 18.0% | 0.30% |
| Comparative Example 6 | 350 | 10 | | 1000 | 18.0% | 1.00% |
| Comparative Example 7 | 350 | 30 | | 1000 | 18.0% | 3.00% |
| Comparative Example 8 | 350 | 100 | | 1000 | 18.0% | 10.00% |
| Example 4 | 350 | | 1 | 1000 | 18.0% | 0.10% |
| Example 5 | 350 | | 3 | 1000 | 18.0% | 0.30% |
| Example 6 | 350 | | 10 | 1000 | 18.0% | 1.00% |
| Example 7 | 350 | | 30 | 1000 | 18.0% | 3.00% |
| Example 8 | 350 | | 100 | 1000 | 18.0% | 10.00% |

TABLE 6

| Note<br>Unit | Primarily diluted rectified spirit 50 vol %<br>mL | Sugar<br>—<br>g | Allulose<br>—<br>g | Final volume<br>—<br>mL | Alcohol concentration<br>—<br>vol % | Sweetener concentration<br>—<br>g/L % | Score of smell or bitterness intensity of alcohol in sensory evaluation |
|---|---|---|---|---|---|---|---|
| Sensory comparison D1 | 300 | | | 1000 | 15.0% | 0.0% | 1 |
| Sensory comparison D2 | 320 | | | 1000 | 16.0% | 0.0% | 3 |
| Sensory comparison D3 | 340 | | | 1000 | 17.0% | 0.0% | 5 |
| Sensory comparison D4 | 360 | | | 1000 | 18.0% | 0.0% | 7 |
| Sensory comparison D5 | 380 | | | 1000 | 19.0% | 0.0% | 9 |

(2) Sensory Evaluation

Sensory evaluation of Examples 4 to 8 and Comparative Examples 4 to 8 was performed in the same manner as in Experimental Example 1. Sensory scores were converted into alcohol concentration according to Equation 3, thereby calculating perceived alcohol concentrations, which, in turn, were compared with the actual alcohol concentrations, respectively, to confirm reduction effects in smell and bitterness of alcohol. Statistical analysis was performed using SAS 9.1 program (SAS Inc., Cary, NC, USA), and sensory evaluation results were analyzed by t-test method.

Figure 2:
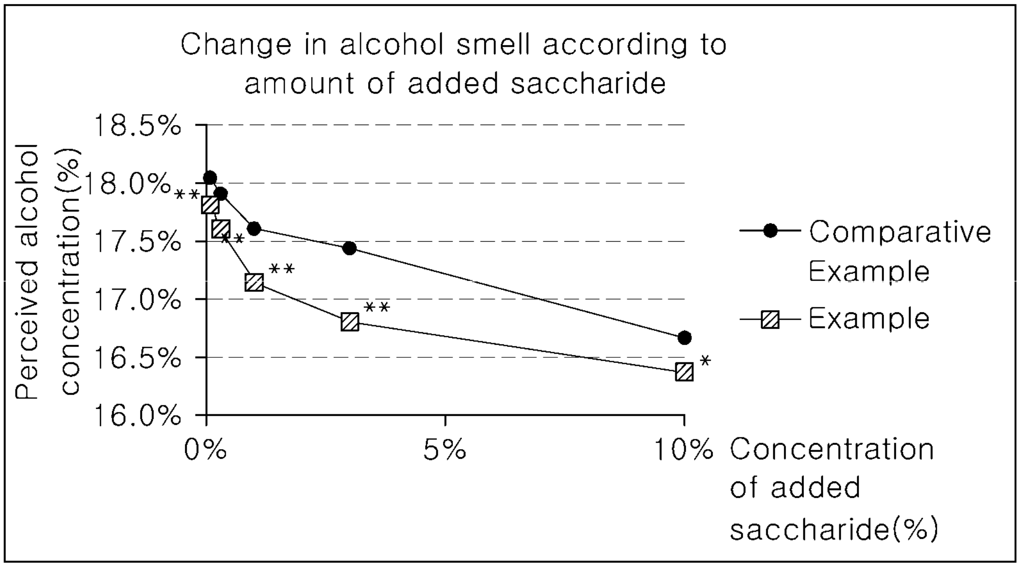
FIG. 2 is a graph showing a relationship between alcohol concentration and alcohol smell according to Examples and Comparative Examples.

As a result, it was confirmed that the samples of Examples 4 to 7 having an allulose content of 0.1% to 3.0% exhibited a statistically significant decrease in alcohol bitterness, as compared with those of Comparative Examples containing the same amount of sugar, and the samples of Examples 5 to 7 having an allulose content of 0.3% to 3.0% exhibited a statistically significant decrease in alcohol smell, as compared with those of Comparative Examples (Table 7, FIGS. 1 and 2).

In addition, it was confirmed entirely that bitterness of alcohol decreased due to increase in sweetness with increasing concentration of sugar or allulose. However, considering that the sweetness intensity of allulose is about 70% that of sugar, it can be seen that reduction effects in smell and bitterness of alcohol is not due to simply sweetness enhancement by addition of saccharides but due to efficacy of allulose.

TABLE 7

| Sample | Comp. Example 4 | Example 4 | Comp. Example 5 | Example 5 | Comp. Example 6 | Example 6 | Comp. Example 7 | Example 7 | Comp. Example 8 | Example 8 |
|---|---|---|---|---|---|---|---|---|---|---|
| Actual alcohol concentration | 18.0% | | 18.0% | | 18.0% | | 18.0% | | 18.0% | |
| Saccharide concentration | 0.1% | | 0.3% | | 1.0% | | 3.0% | | 10.0% | |

TABLE 7-continued

| Sample | Comp. Example 4 | Example 4 | Comp. Example 5 | Example 5 | Comp. Example 6 | Example 6 | Comp. Example 7 | Example 7 | Comp. Example 8 | Example 8 |
|---|---|---|---|---|---|---|---|---|---|---|
| Perceived alcohol concentration (bitterness) | 18.1% | 17.8% | 18.0% | 17.7% | 17.8% | 17.3% | 17.5% | 16.9% | 16.6% | 16.3% |
| p-value | 0.093 | | 0.011 | | 0.001 | | 0.000 | | 0.064 | |
| Perceived alcohol concentration (smell) | 18.0% | 17.8% | 17.9% | 17.6% | 17.6% | 17.1% | 17.4% | 16.8% | 16.7% | 16.4% |
| p-value | 0.029 | | 0.008 | | 0.000 | | 0.000 | | 0.077 | |

What is claimed is:

1. A method for reducing or masking bitterness or smell of ethanol in a prepared alcoholic beverage, comprising:

adding a saccharide composition to the prepared alcoholic beverage, wherein the saccharide composition comprises allulose in an amount of 95 parts by weight to 100 parts by weight relative to 100 parts by weight of the saccharide composition in terms of dried solid content, and wherein the saccharide composition is free of glucose and sucrose, the ethanol is present in an amount of 8 vol % to 18 vol % based on the total volume of the prepared alcoholic beverage, the saccharide composition is added in an amount of 1.00% to 3.00% (w/v) based on the total volume of the prepared alcoholic beverage, the allulose is added in an amount of 55.5 g to 166.7 g per 1 L of the ethanol of the prepared alcoholic beverage, and the prepared alcoholic beverage is a distilled alcoholic beverage.

* * * * *